United States Patent [19]

Wilken et al.

[11] Patent Number: 5,143,360
[45] Date of Patent: Sep. 1, 1992

[54] APPARATUS FOR VERTICAL ADJUSTMENT OF A CLAMPING DEVICE

[75] Inventors: Enno Wilken; Helmut Eickhorst, both of Varel, Fed. Rep. of Germany

[73] Assignee: Deutsche Airbus GmbH, Bremen, Fed. Rep. of Germany

[21] Appl. No.: 717,971

[22] Filed: Jun. 20, 1991

[30] Foreign Application Priority Data

Jun. 22, 1990 [DE] Fed. Rep. of Germany ....... 4019936

[51] Int. Cl.⁵ .............................................. B25B 11/00
[52] U.S. Cl. ........................................ 269/21; 269/60; 269/61
[58] Field of Search ............................ 269/21, 60, 61; 294/64 R; 248/363; 51/235; 279/3 R

[56] References Cited

U.S. PATENT DOCUMENTS

| 1,414,683 | 5/1922 | Anglada | 254/103 |
| 3,800,741 | 4/1974 | Boulton | 269/21 |
| 3,804,397 | 4/1974 | Neumann | 269/21 |
| 3,957,263 | 5/1976 | Christl | 269/21 |

FOREIGN PATENT DOCUMENTS

| 069230 | 1/1983 | European Pat. Off. | 269/21 |
| 2921835 | 5/1979 | Fed. Rep. of Germany | 254/89 R |
| 2205258 | 6/1987 | United Kingdom | 269/21 |

Primary Examiner—Robert C. Watson
Attorney, Agent, or Firm—Anderson Kill Olick

[57] ABSTRACT

A spindle of clamping apparatus is adjusted in height or elevation in an infinitely variable manner by means of a transmission. The transmission comprises a pinion connected with a motor meshing with a gear wheel, which is indirectly connected with the spindle. The apparatus is especially useful for clamping large-area work pieces.

4 Claims, 2 Drawing Sheets

APPARATUS FOR VERTICAL ADJUSTMENT OF A CLAMPING DEVICE

The invention is directed to an apparatus for vertical or height adjustment of a clamping arrangement for large area work pieces such as metal sheeting or the like, which are retained for machining by a negative pressure clamping device.

BACKGROUND OF THE INVENTION

A negative pressure clamping arrangement is known from the DE-PS 31 26 720. It comprises a clamping head, consisting of a head portion clamping the work piece, as well as a head retainer, which is held in a base portion by a spindle so as to be vertically adjustable. The adjustment is performed manually by displacing the spindle, which can be locked by a screw in its adjusted position.

SUMMARY OF THE INVENTION

An object of the invention is to provide an improved apparatus for a clamping device which is automatically adjustable in height in an infinitely variable manner.

This task is achieved in accordance with the invention by mounting the spindle in a bearing sleeve so as to be rotationally supported by means which can be actuated to rotate the sleeve to controllably adjust the height of the spindle.

The main advantages achieved by the invention consist in performing the height adjustment of the clamping head automatically by means of a transmission or gearing cooperating with a motor, which indirectly acts upon the spindle and adjusts same in height in an infinitely variable manner. For this purpose, in a preferred embodiment, the spindle is guided in ball screw spindle nuts of a support or bearing sleeve, which in turn is retained by means of roller bearings in an external base member.

The drive motor of the transmission can be connected with a known electric control apparatus, which can process an inputted height parameter in such a way that the clamping head can be adjusted at an appropriately correct height, meaning the work piece to be installed there can be directly held by the clamping arrangement without any sort of correction of the height or vertical adjustment.

Detection of the adjusted vertical position is performed, for instance, by an attached shaft encoder, which comprises a pinion meshing with the gear wheel. The measured spindle rotations will indicate its height. Alternatively, the drive or the measuring system can also function by means of toothed belts or the like.

In order to prevent any undesirable rotary motion of the spindle, at the base of the device can be provided a torque limiter or holder which moves on an adjusting spring fastened to a guide tube adjacent to the base member.

The spindle is preferably provided with a central air duct for supplying the clamping arrangement with compressed air or vacuum, in which duct is located an air piston which is connected with the base member through a stand pipe.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

DETAILED DESCRIPTION OF THE PREFERRED EMBODIMENTS

Figure 1:
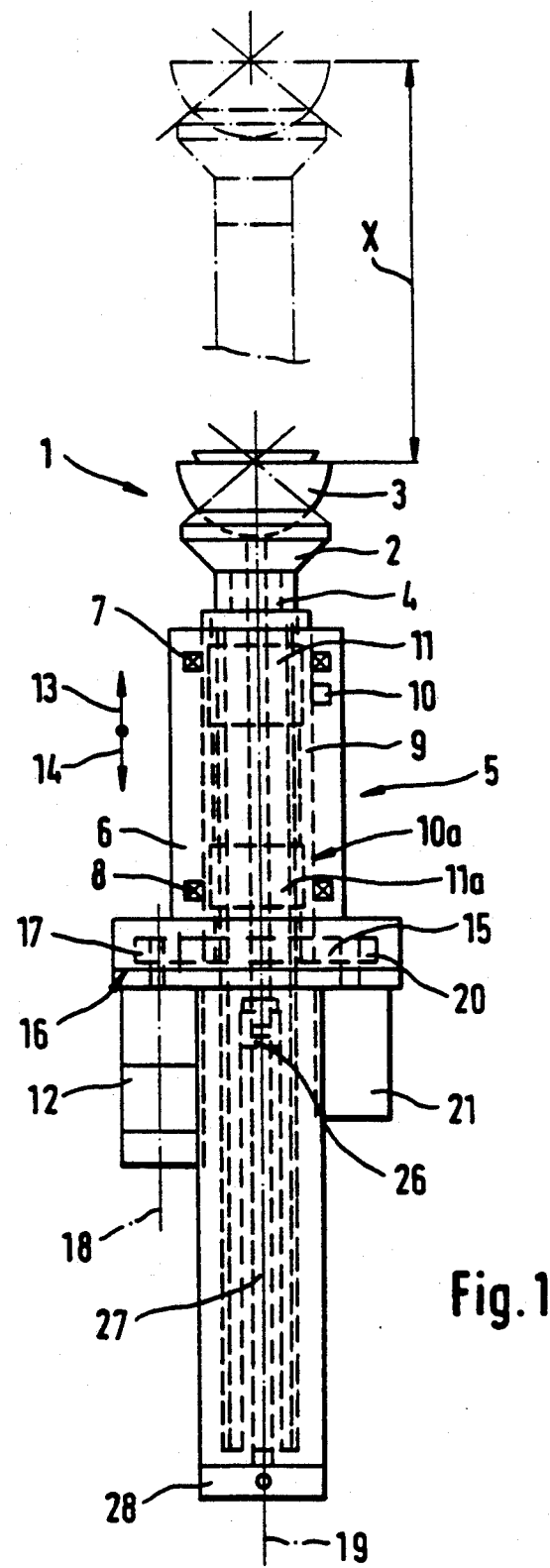
FIG. 1 is a front cross-sectional view of an apparatus according to the invention for vertical adjustment.
Figure 2:
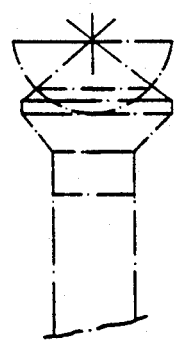
FIG. 2 is a side view of the apparatus in FIG. 1

Referring now to the drawings, the clamping arrangement 1 shown comprises a head portion 2 where a negative pressure clamping element 3 is supported. A threaded spindle 4, fastened to the head portion 2, is connected with a device 5 for height or vertical adjustment.

The height adjustment device 5 comprises essentially a base member 6 in which a bearing sleeve 9 is rotatably supported on roller bearings 7, 8. Transmission elements 10, 10a are clamped without tolerance in this sleeve 9 and rotate with the sleeve. These transmission elements 10, 10a consist of ball screw-spindle nuts 11, 11a in which the spindle 4 is threadingly arranged so as to be free to rotate therein.

The bearing sleeve 9 is made to rotate by a transmission 12 in such a way that the spindle 4 is axially adjustable in the direction of the arrows 13 and 14.

The transmission 12 comprises a gear wheel 15 connected with the bearing sleeve 9 and which meshes with a pinion 17 driven by a motor 16.

The gear wheel 15 is arranged coaxially to the bearing sleeve 9, and the axis 18 of the motor 16 is axially parallel to the longitudinal axis 19 of the device. Instead of a gear wheel 15, a toothed rack, which then would be arranged on the bearing sleeve 9, is also usable. The gear wheel 15 is connected by means of another pinion 20 with a shaft encoder 21 for determination of the height or elevational position of the spindle.

The motor 16 can be connected with an electrical control apparatus, into which the desired elevation parameter can be fed and which controls the motor 16 for the axial displacement of the spindle 4 as a function of these parameters.

In order to adjust the elevation or height of the clamping arrangement 1, for instance by an amount X as shown in FIG. 1, the pinion 17 is made to rotate by the motor 16. The pinion 17, on its part, drives the gear wheel 15 on the bearing sleeve 9 and rotates the latter. Because of this the spindle 4 of the clamping arrangement 1 guided in the ball screw spindle nuts 11, 11a is displaced in height.

Figure 3:
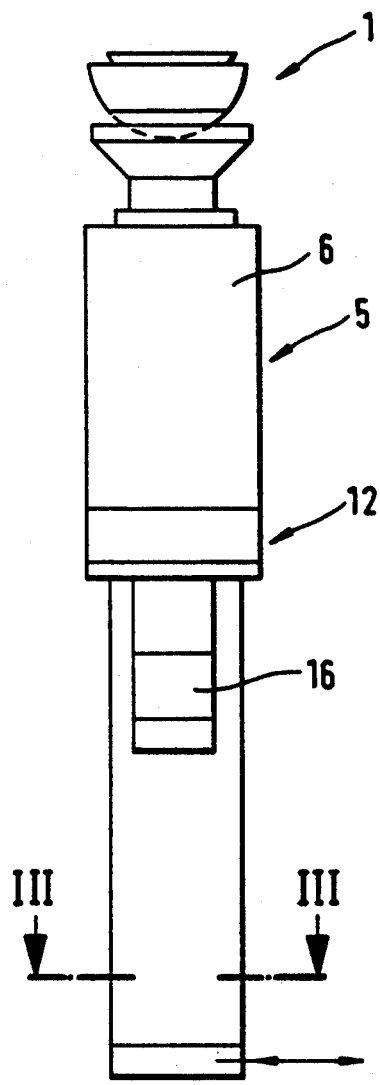
FIG. 3 is a cross-section along the line III—III in FIG. 2.
Figure 3:
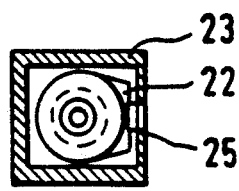

A torque holder 22 (FIG. 3) is provided at the base of the device to prevent an unintended, undesirable rotational motion of the spindle 4. The torque holder 22 moves on an adjustment spring 25 fastened in a guide tube 23 at the base of the device.

The supply of the clamping unit 1 with compressed air is assured by a central compressed air duct in the spindle 4, in which an air piston 26 is arranged in a sliding manner. The piston 26 is connected by a stand pipe 27 with a base plate 28.

While the invention has been described in connection with preferred embodiments, it will be understood that modifications thereof within the principles outlined above will be evident to those skilled in the art and thus the invention is not limited to the preferred embodiments but is intended to encompass such modifications.

We claim:

1. An improved apparatus for height adjustment of a clamping element of a negative pressure clamping arrangement, upon which large area workpieces, such as metal sheeting, are retained for purposes of caching, the improvement comprising:

a base member;

means for adjustably maintaining the height of the clamping element on the base member, said adjustably supporting means including a bearing sleeve held in the base member by two roller bearings axially spaced from each other, two ball screw-spindle nuts retained in the bearing sleeve approximately in the plane of the roller bearings, a spindle, a guide tube surrounding the spindle, and an adjustment spring fastened in the guide tube and engaging the spindle so as to act as a torque blocker, the spindle being supported in the bearing sleeve by said ball screw-spindle nuts so as to be adjustable in height and axially displaceable in the surrounding guide tube via the torque blocker adjustment spring, the clamping element being fastened on an end of the spindle opposite the adjustment spring; and means for rotating the bearing sleeve, including a drive motor, a first pinion connected to the drive motor, and a gear wheel circumferentially connected with the bearing sleeve and meshing with the first pinion of the drive motor.

2. Apparatus according to claim 1, and further comprising an electrical control device connected to the drive motor for adjusting the clamping element to the level of a clampable work piece automatically and in an infinitely variable manner as a function of an inputted height parameter.

3. Apparatus according to claim 1, wherein the gear wheel is arranged coaxially upon the bearing sleeve, and the first pinion with the motor extends axially parallel to the spindle.

4. Apparatus according to claim 1, further comprising a shaft encoder and a second pinion which meshes with the gear wheel, said second pinion being connected with the shaft encoder.

* * * * *